US008001791B2

(12) United States Patent
Somanath et al.

(10) Patent No.: US 8,001,791 B2
(45) Date of Patent: Aug. 23, 2011

(54) TURBINE ENGINE FRAME HAVING AN ACTUATED EQUILIBRATING CASE

(75) Inventors: Nagendra Somanath, Manchester, CT (US); Christopher M. Dye, South Windsor, CT (US); Keshava B. Kumar, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 952 days.

(21) Appl. No.: 11/938,988

(22) Filed: Nov. 13, 2007

(65) Prior Publication Data

US 2009/0120102 A1 May 14, 2009

(51) Int. Cl.
*F02C 7/20* (2006.01)
*F01D 25/26* (2006.01)

(52) U.S. Cl. ................ 60/799; 60/796; 60/800; 60/805; 415/138

(58) Field of Classification Search .................... 60/799, 60/800, 805, 796–798; 415/135, 136–138
See application file for complete search history.

(56) References Cited

U.S. PATENT DOCUMENTS

| | | | | |
|---|---|---|---|---|
| 4,201,046 | A | 5/1980 | De Negris et al. | |
| 4,422,300 | A | 12/1983 | Dierberger et al. | |
| 5,275,357 | A | 1/1994 | Seelen et al. | |
| 5,319,922 | A | 6/1994 | Brantley | |
| 5,439,348 | A * | 8/1995 | Hughes et al. | 415/173.4 |
| 5,653,351 | A | 8/1997 | Grout et al. | |
| 5,867,979 | A * | 2/1999 | Newton et al. | 60/226.1 |
| 6,082,959 | A | 7/2000 | Van Duyn | |
| 6,491,497 | B1 | 12/2002 | Allmon et al. | |
| 6,708,482 | B2 | 3/2004 | Seda | |
| 6,783,319 | B2 | 8/2004 | Doerflein et al. | |
| 6,883,303 | B1 | 4/2005 | Seda | |
| 6,910,863 | B2 | 6/2005 | Scardicchio et al. | |
| 6,926,495 | B2 * | 8/2005 | Diakunchak | 415/173.3 |
| 7,195,447 | B2 | 3/2007 | Moniz et al. | |
| 7,246,995 | B2 * | 7/2007 | Zborovsky | 415/137 |
| 7,448,846 | B2 * | 11/2008 | Ruthemeyer et al. | 415/135 |
| 7,578,132 | B2 * | 8/2009 | Webster | 60/770 |
| 7,632,064 | B2 * | 12/2009 | Somanath et al. | 415/191 |
| 2005/0106010 | A1 * | 5/2005 | Evans | 415/160 |

* cited by examiner

*Primary Examiner* — Michael Cuff
*Assistant Examiner* — Young Choi
(74) *Attorney, Agent, or Firm* — Carlson Gaskey & Olds P.C.

(57) ABSTRACT

The turbine engine assembly has a frame and a turbine engine spool. A strut couples the frame to the spool and an actuator couples the strut to the frame. The actuator has a spring.

19 Claims, 3 Drawing Sheets

TURBINE ENGINE FRAME HAVING AN ACTUATED EQUILIBRATING CASE

BACKGROUND OF THE INVENTION

This invention relates to a frame for a turbine engine such as a mid-turbine frame.

A mid-turbine frame for a turbine engine couples a spool to a high spool of a turbine engine. The mid-turbine frame is located between the high pressure turbine and the low pressure turbine. Consequently, there is a large thermal gradient between the high pressure turbine and the low pressure turbine that contributes to the load on the frame in addition to the mechanical loads of the turbine engine in normal operation. Because of the large thermal gradient at this location, there is a greater propensity for the mid-turbine frame to distort and become oval in shape. This ovalization of the frame can interfere with the normal operation of the low spool and the high spool of the turbine engine, placing excess loads on the bearings that support the spools on the frame.

A need therefore exists for a frame that offsets the load created in this region of the turbine engine.

SUMMARY OF THE INVENTION

The invention comprises a turbine engine assembly having a frame and a turbine engine spool. A strut couples the frame to the turbine engine spool. In addition, an actuator couples the strut to the frame. The actuator has a spring.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
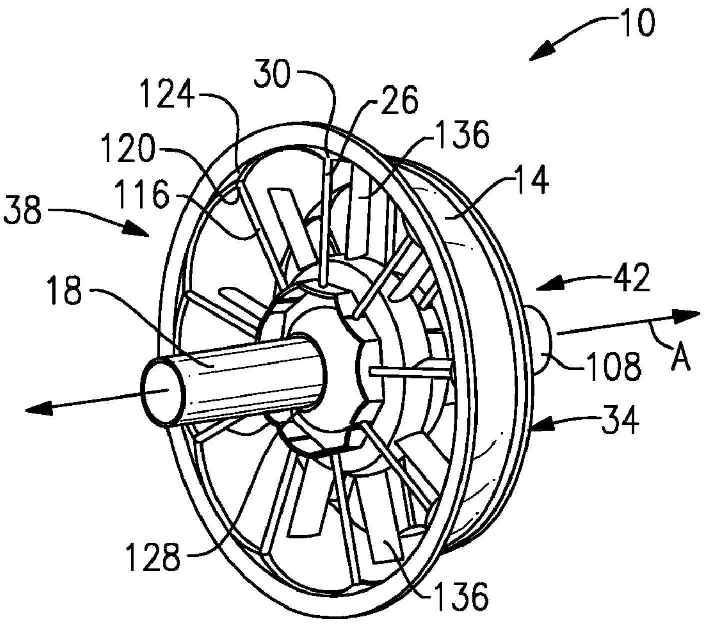
FIG. 1 illustrates a perspective view of the inventive turbine engine assembly with frame, turbine engine spool, strut and actuator.
Figure 2:
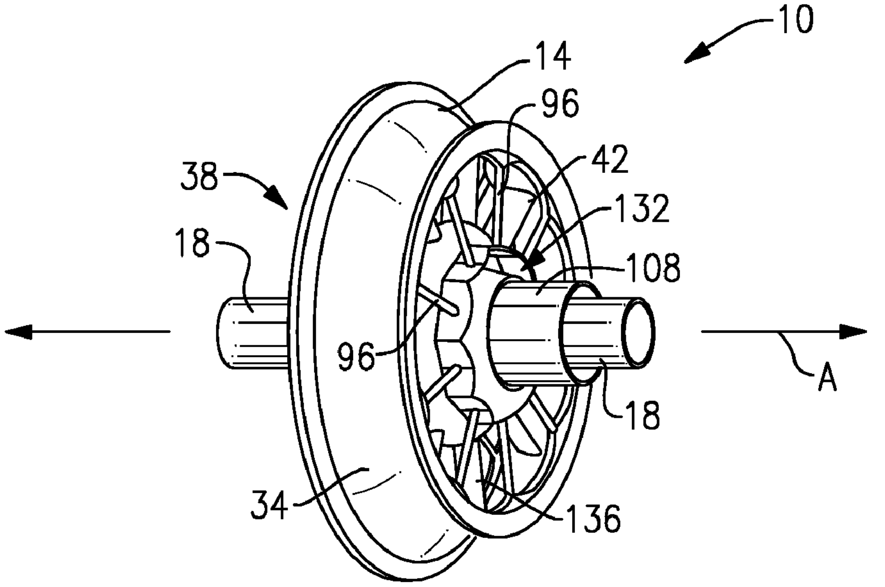
FIG. 2 illustrates an alternative perspective view of the turbine engine assembly of FIG. 1.
Figure 3:
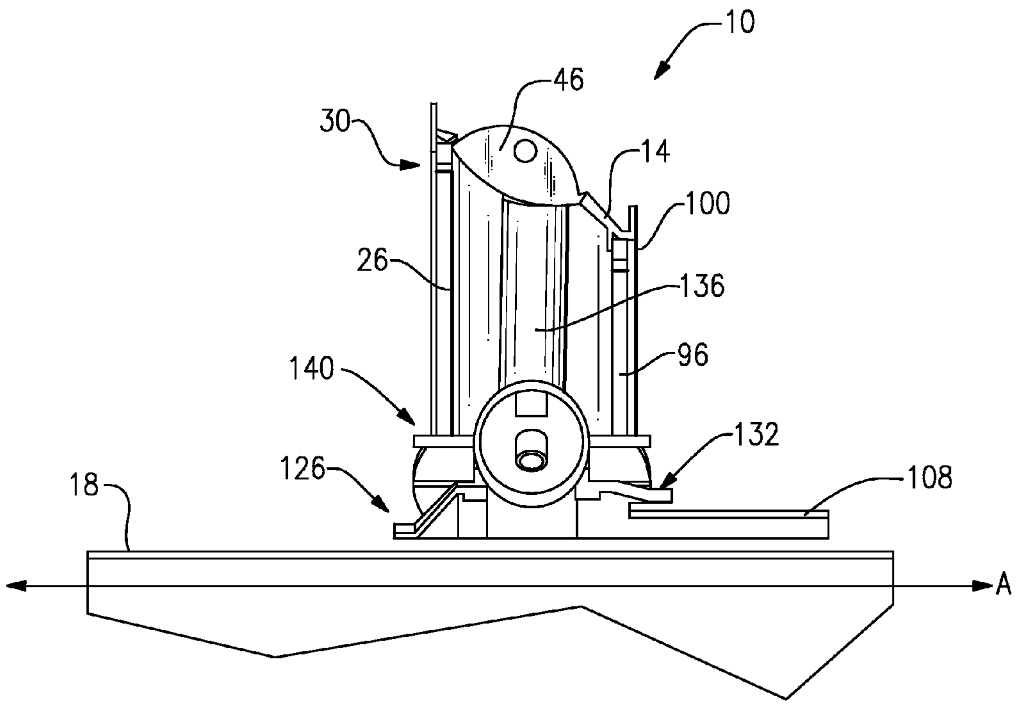
FIG. 3 illustrates a cross-sectional view of the turbine engine assembly, including frame, turbine engine spools, struts and torque box.

FIGS. 1 and 2 illustrate alternative perspective views of the inventive turbine engine assembly 10. Turbine engine assembly 10 has frame 14 having a generally cylindrical shape 34. First opening 38 is provided on one side of frame 14 while second opening 42 is provided on the other. First opening 38 is spaced from second opening 42 along an axis, axis A, of generally cylindrical shape 34. Disposed within frame 14 is first turbine engine spool 18 and second turbine engine spool 108. As shown in FIG. 2, first turbine engine spool 18 is nested within second turbine engine spool 108. First turbine engine spool 18, a low spool, is linked to a turbine fan, a low pressure compressor, and a low pressure turbine while second turbine engine spool 108, a high spool, is linked to a high pressure compressor, and a high pressure turbine as known. First spool 18 and second turbine engine spool 108 rotate about axis A on low spool bearing 128 and high spool bearing 132. First turbine engine spool 18 and second spool 108 are supported to rotate about axis A by first struts 26, vanes 136 and second struts 96. With reference to FIG. 3, torque box 140 links movement of first strut 26 with second strut 96 so that loads on frame 14 as well as from turbine engine spools 18 and 108 may be balanced.

Figure 4:
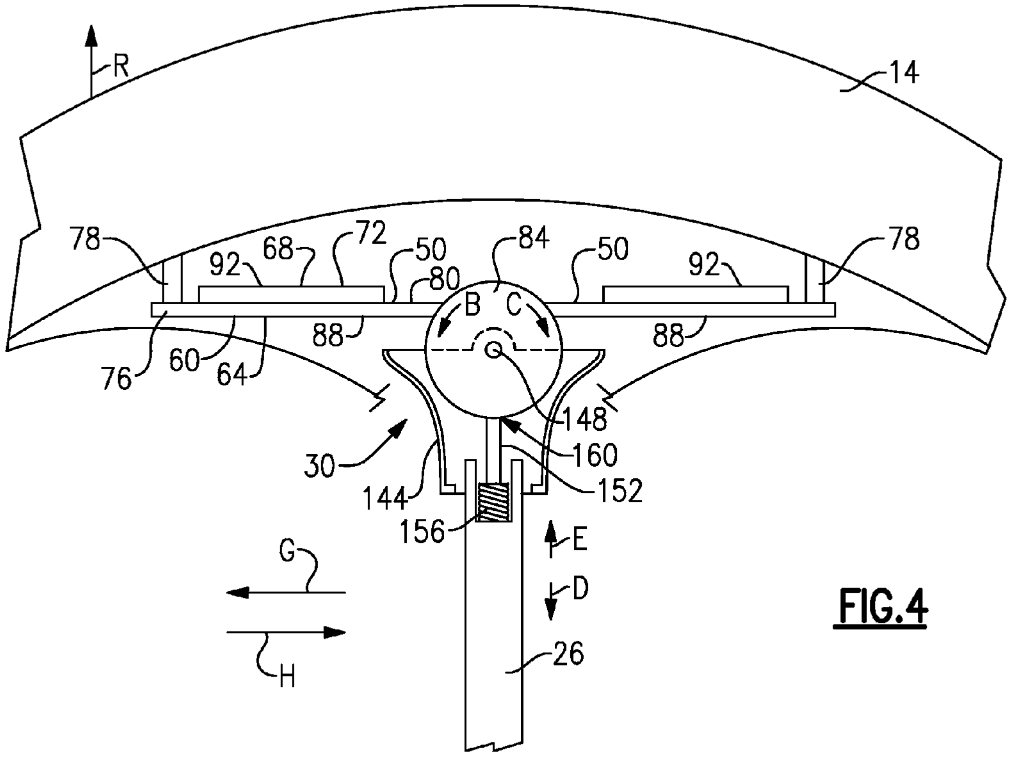
FIG. 4 illustrates a view of an inventive actuator of FIGS. 1-3.

In contrast to other turbine engine assemblies, inventive turbine engine assembly 10 employs a unique actuator to offset loads caused by thermal forces as well as mechanical forces. With reference to FIG. 4, first actuator 30 is shown coupling first strut 26 to frame 14. First actuator 30 comprises first spring 50 disposed about both sides of cam 84. First spring 50 is made of two leafs, first leaf 88 and second leaf 92. First leaf 88 is made of first material 60 having first coefficient of thermal expansion 64 while second leaf 92 is made of second material 68 having second coefficient of thermal expansion 72. First material 60 may be steel, which has a positive coefficient of thermal expansion, while second material 68 may be ceramic, which may have a negative coefficient of thermal expansion. The coefficient of thermal expansion of steel is much greater than the coefficient of thermal expansion of ceramic. For reasons that will be explained later, this difference contributes to the operation of actuator 30.

As shown, first leaf 88 is attached to frame 14 at first portion 76 by screw 78. At the other end, second portion 80 of first leaf 88 is secured to cam 84. Cam 84 is affixed to cup 144 by pin 148. Cam 84 may rotate in the direction of arrow B or arrow C, although this movement and rotation will be slight in actual operation. Cam 84 rests on rod 152, which itself is coupled to spring 156, having one end attached to rod 152 and the other end attached to first strut 26. Cam 84 may rotate on contact surface 160 of rod 152 and may also move in the direction of arrow D or E relative to first strut 26 as shown. Cup 144 will likewise move with cam 84 along the directions of arrow D or E because of its link to cam 84 through pin 148. With reference to FIG. 3, first strut 26 is linked to torque box 140 by a mechanical connection, such as a ball joint. First strut 26 and second strut 96 are made in the same way, the only difference being, as shown in FIG. 3, the length of the actual strut.

As shown in FIG. 1, multiple first struts 26 extend radially about spool 18. With reference to FIG. 4, each first strut 26 is separated from its neighboring first strut 26 so that first portion 76 is secured independently to frame 14 from a neighboring spring of a neighboring actuator. In this way, first strut 26 may move somewhat independently of its neighboring strut. For example, with reference to FIG. 1, third strut 116 is coupled to third actuator 120 having third spring 124. Third strut 116 is spaced from first strut 26 such that third spring 124 is not affixed to first spring 50. Accordingly, first strut 26 may move independently of third strut 116. These radially spaced first struts 26 ensure that frame 14 has a segmented design, which divides loading and unloading forces on frame 14 into more controllable segments. Consequently, ovalization of frame 14 is minimized.

Figure 5:
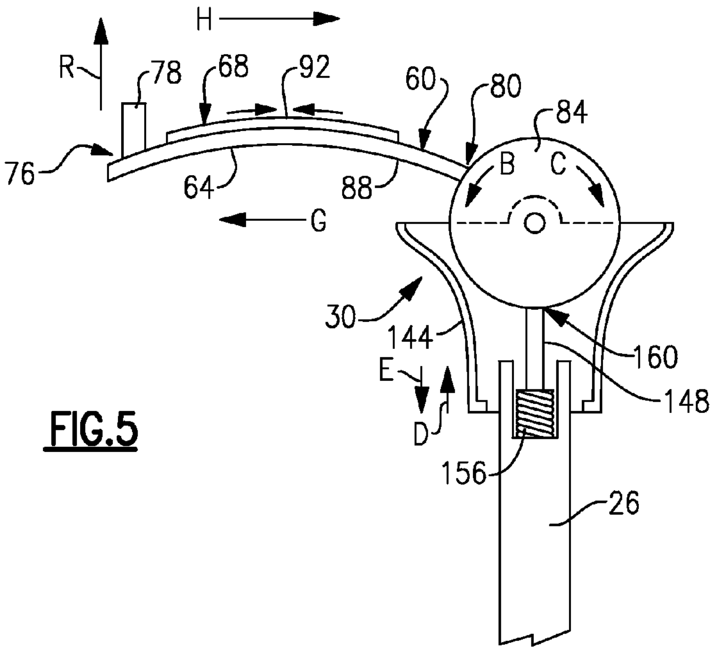
FIG. 5 illustrates a cross-sectional view of a spring used in the actuator of FIGS. 1-4.

The operation of first strut 26 and actuator 30 will now be explained with reference to FIGS. 4 and 5. Distortions of frame 14 are transmitted to first spring 50 by screw 78 as frame 14 expands radially outward, say in the direction of arrow R, such as due to thermal expansion of frame 14. Frame 14 will pull screw 78 as well as first portion 76 of first spring 50 in the same direction, creating tension in first leaf 88, which is fixed at the other end to cam 84. Second leaf 92 is fixed, such as by bonding to first leaf 88, and is made of second material 68 having second coefficient of thermals expansion 72, which is less than the first coefficient of thermal expansion of first material 60. Consequently, tension in the direction of arrow G of first leaf 88, made of steel, will be resisted by second leaf 92 in the direction of arrow H, thereby offsetting pull of frame in the direction of arrow R of first portion 76. Indeed, if second material 68 is a ceramic having a negative coefficient of thermal expansion, even greater resistance to tensile forces in the direction of arrow G is accomplished. Consequently, while frame 14 may tend to expand due to high temperatures in the direction of arrow R, such expansion is resisted by the thermal contraction of second material 68.

Tension in first leaf 88 may be further reduced by rotation of cam 84 in the direction of arrow B. In the event force on frame 14 is reduced in the direction of arrow R, then first leaf 88 may resiliently contract in the direction of arrow H causing cam 84 to rotate back in the direction of arrow C. In this way, forces caused by mechanical loading as well as thermal expansion can be alleviated by actuator 30.

In addition, in the event of forces on strut in the direction of arrow E, such as caused by loads from first turbine engine spool 18, coil spring 156 is provided to absorb this force by compressing so that movement of cam 84 in the same direction of arrow E is eliminated or reduced. When first strut 26 moves back in the direction of arrow D, cam 84 is relatively unaffected.

The inventive strut design permits load balance and equilibrium of forces from bearings, here low spool bearing 128 and high spool bearing 132, as well as forces from thermal expansion of frame 14. In particular, thermal forces are offset by first spring 50 while mechanical loads from bearings are offset by coil spring 156. In this manner, frame 14 achieves radial and circumferential stability, which leads to longer part life of bearings 128, 132 and frame 14.

The foregoing description shall be interpreted as illustrative and not in any limiting sense. A worker of ordinary skill in the art would recognize that certain modifications would come within the scope of this invention. For that reason, the follow claims should be studied to determine the true scope and content of this invention.

We claim:

1. A turbine engine assembly, comprising:
- a frame;
- a first turbine engine spool;
- a first strut for coupling said frame to said first turbine engine spool; and
- a first actuator coupling said first strut to said frame, said first actuator having a first spring and a cam, said cam coupling said first spring to said first strut.

2. The turbine engine assembly of claim 1 wherein said first spring comprises a composite having a first material with a first coefficient of thermal expansion and a second material with a second coefficient of thermal expansion, said first coefficient of thermal expansion different than said second coefficient of thermal expansion.

3. The turbine engine assembly of claim 2 wherein one of said first coefficient of thermal expansion and said second coefficient of thermal expansion is negative.

4. The turbine engine assembly of claim 2 wherein said first coefficient of thermal expansion is positive and said second coefficient of thermal expansion is negative.

5. The turbine engine assembly of claim 2 wherein said first material is a metal and said second material is a ceramic.

6. The turbine engine assembly of claim 1 wherein said first spring is coupled to said frame.

7. The turbine engine assembly of claim 1 wherein said first spring comprises a first leaf spring.

8. The turbine engine assembly of claim 7 wherein a first portion of said first leaf spring is coupled to said frame and a second portion of said first leaf spring is coupled to said strut.

9. The turbine engine assembly of claim 1 including a second strut spaced along an axis of said first spool, said second strut coupled to said frame by a second actuator comprising a second spring.

10. The turbine engine assembly of claim 9 including a second turbine engine spool coaxial with said first turbine engine spool, said second strut coupled to said frame and said second turbine engine spool.

11. The turbine engine assembly of claim 1 including a second strut spaced radially from said first strut, said second strut coupled to said frame by a second actuator comprising a second spring.

12. The turbine engine assembly of claim 1 wherein said frame comprises a generally cylindrical shape having a first opening and a second opening, said first opening spaced along an axis of said cylindrical shape from said second opening, wherein said frame curves inwardly between said first opening and said second opening.

13. A turbine engine assembly, comprising:
- a frame;
- a first turbine engine spool;
- a first strut for coupling said frame to said first turbine engine spool; and
- a first actuator coupling said first strut to said frame, said first actuator having a first spring coupled to said frame, said first actuator having a cam coupling said first spring to said first strut, said first spring comprising a first leaf of a first material with a first coefficient of thermal expansion and a second leaf of a second material with a second coefficient of thermal expansion, said first coefficient of thermal expansion different than said second coefficient of thermal expansion, said first leaf disposed on said second leaf.

14. The turbine engine assembly of claim 13 wherein one of said first coefficient of thermal expansion and said second coefficient of thermal expansion is negative.

15. The turbine engine assembly of claim 14 wherein said first coefficient of thermal expansion is positive and said second coefficient of thermal expansion is negative.

16. The turbine engine assembly of claim 13 wherein a first portion of said first leaf spring is secured to said frame and a second portion of said first leaf spring is secured to said strut.

17. The turbine engine assembly of claim 16 including a second strut radially spaced from said first strut along a radius of said first spool, said second strut coupled to said frame by a second actuator comprising a second spring, said second spring comprising a third leaf of said first material with said first coefficient of thermal expansion and a fourth leaf of said second material with said second coefficient of thermal expansion, said first coefficient of thermal expansion different than said second coefficient of thermal expansion, said third leaf disposed on said fourth leaf, said first spring secured to said frame at a different location than said second spring to said frame.

18. A strut assembly for a turbine engine, comprising:

a strut for coupling a turbine frame to a turbine engine spool; and an actuator for coupling said strut to the frame, said actuator having a spring comprising a first material with a first coefficient of thermal expansion and a second material with a second coefficient of thermal expansion, said first coefficient of thermal expansion different than said second coefficient of thermal expansion, said actuator further comprising a cam for coupling said spring to said strut.

19. The turbine engine assembly of claim 18 wherein said actuator permits rotation between said spring and said strut.

* * * * *